United States Patent [19]

Lee

[11] Patent Number: 5,845,110
[45] Date of Patent: Dec. 1, 1998

[54] FACSIMILE TRANSMISSION APPARATUS USING PLAIN PAPER SHEETS AND METHOD FOR ASSEMBLING THE FACSIMILE TRANSMISSION APPARATUS

[75] Inventor: Hyo-Jin Lee, Euiwang, Rep. of Korea

[73] Assignee: SamSung Electronics Co., Ltd., Suwon, Rep. of Korea

[21] Appl. No.: 313,998

[22] Filed: Sep. 28, 1994

[30] Foreign Application Priority Data

Sep. 28, 1993 [KR] Rep. of Korea .................. 1993 20096

[51] Int. Cl.⁶ ............................ G03G 15/00; G03G 21/00
[52] U.S. Cl. ................................................................. 399/2
[58] Field of Search ................................ 355/200, 210; 399/2

[56] References Cited

U.S. PATENT DOCUMENTS

| | | | |
|---|---|---|---|
| 4,335,950 | 6/1982 | Gunzelmann | 355/200 |
| 4,563,078 | 1/1986 | Fantuzzo | 355/200 |
| 4,783,678 | 11/1988 | Honda | 355/308 |
| 4,873,548 | 10/1989 | Kobayashi et al. | 355/200 |
| 4,876,572 | 10/1989 | Nagatsuna | 355/210 |
| 4,879,580 | 11/1989 | Kaneda | 355/309 X |
| 4,908,661 | 3/1990 | Iwata et al. | 355/210 X |
| 4,947,208 | 8/1990 | Komatsu et al. | 355/200 |
| 4,985,731 | 1/1991 | Sakakura et al. | 355/210 |
| 5,028,966 | 7/1991 | Kozuka et al. | 355/260 |
| 5,041,871 | 8/1991 | Hata | 355/200 |
| 5,041,872 | 8/1991 | Nukaya et al. | 355/200 |
| 5,045,885 | 9/1991 | Nishio | 355/245 |
| 5,049,940 | 9/1991 | Yamaguchi et al. | 355/260 |
| 5,089,846 | 2/1992 | Tabuchi | 355/200 |
| 5,183,431 | 2/1993 | Todokoro | 446/142 |
| 5,311,253 | 5/1994 | Ohmori et al. | 355/200 |
| 5,353,098 | 10/1994 | Lim | 355/200 |

*Primary Examiner*—Fred L. Braun
*Attorney, Agent, or Firm*—Robert E. Bushnell, Esq.

[57] ABSTRACT

A facsimile transmission apparatus having an electrostatic printing system uses plain paper as a recording sheet. The apparatus uses an electrophotographic developing system and includes: (1) an upper frame mold which contains a photosensitive drum assembly with a photosensitive drum and a charging device, the upper frame also contains an exposure device and a fixing device; (2) a lower frame molded in the shape of a box with an open top portion, the lower frame contains a developing device for selectively attaching toner to indicate a visible charging image on the photosensitive drum, a transfer device for transferring the visible image onto the photosensitive drum, a pickup roller for picking up the paper, and a conveyor roller for conveying the paper to the developing device.

48 Claims, 12 Drawing Sheets

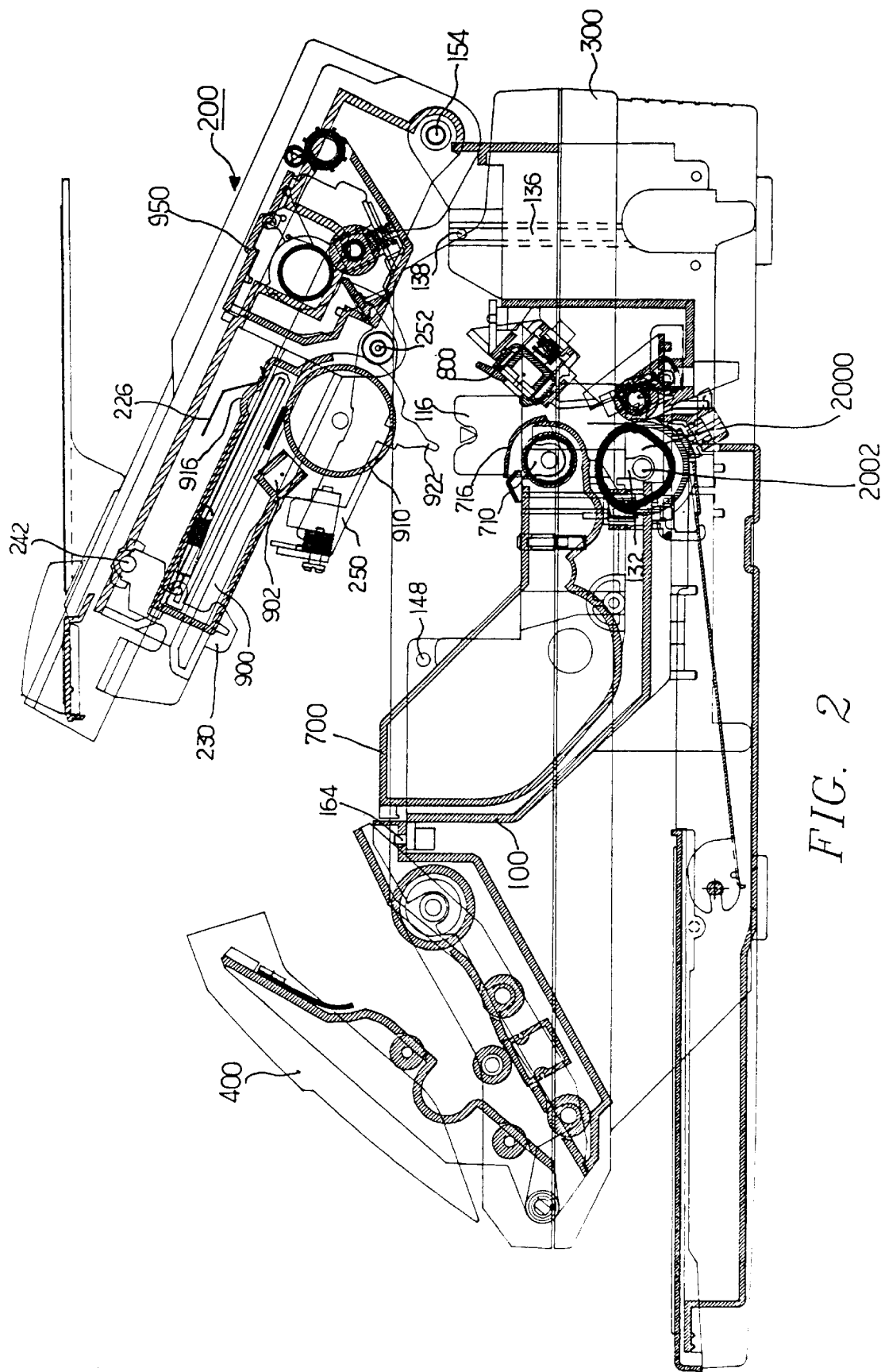

FACSIMILE TRANSMISSION APPARATUS USING PLAIN PAPER SHEETS AND METHOD FOR ASSEMBLING THE FACSIMILE TRANSMISSION APPARATUS

FIELD OF THE INVENTION

The present invention relates to a facsimile transmission apparatus and more particularly to a facsimile transmission apparatus having an electrostatic printing system using plain paper as a recording sheet.

BACKGROUND OF THE INVENTION

Generally, facsimile transmission apparatuses can be classified according to the type of printing they perform. Such types include discharge breaking printing, ink-jet printing, thermal-sensitive printing, and electrostatic printing, in which the electrostatic printing system can execute plane scanning and wherein printing is generally performed in a speedy manner.

The well-known facsimile transmission apparatus using plain paper as a recording sheet is typically assembled such that main frame portions of the apparatus, which are press-fabricated with a steel plate, are assembled with each of the component units as respective assembling elements.

However, the well-known facsimile transmission apparatus using plain paper as the recording sheet is often difficult to assemble since it contains a large number of components. The assembly process is further complicated since the apparatuses are typically constructed as a large frame structure. The facsimiles are also very heavy since their housings are constructed from the pressed steel plate, thereby rendering assembly even more arduous. Moreover, the facsimiles typically use a laser beam printer ("LBP") engine with a separately attached sheet reading device, thereby rendering the facsimile inconveniently large.

There have been several attempts in the art to solve the above-mentioned problems. One such attempt is disclosed in U.S. Pat. No. 4,335,950 entitled *Frame Assembly With Upper And Lower Frame Members For Automatic Reproducing Apparatus* issued on 22 Jun. 1982 to Gunzelmann et al. In this invention, a reproducing apparatus is made up of upper and lower molded plastic frame members. The frame members each have machine element mounting means molded within. Although this art has certain advantages in its own right, I believe that it can be substantially improved upon by utilizing several specific features which I herein disclose. These features, as will be seen, enable facsimiles or other similar types of electrostatic machines to be easily assembled in an almost fool-proof manner.

Another more recent attempt is disclosed in U.S. Pat. No. 5,045,885 entitled *Link Mechanism Provided Between An Upper Frame And A Lower Frame Of An Image Forming Apparatus* issued on 3 Sep. 1991 to Nishio. Here, upper and lower frame portions are rotatably connected so that the upper frame can be opened and the developing device and image forming drum can be mounted or demounted without damaging either component. While this invention does solve certain problems, I believe its scope of improvement over the prior art is limited since it only addresses assembly and disassembly of the developing device and the photosensitive drum. Since such reproducing devices have many more components than just these two, it is clear that greater improvement can achieved.

SUMMARY OF THE INVENTION

Accordingly, it is an object of the present invention to provide a facsimile transmission apparatus having a unitary body with a multi-functional molded frame.

It is another object of the present invention to provide a facsimile transmission apparatus for plain paper sheets which can be easily assembled.

It is still another object of the present invention to provide a facsimile transmission apparatus for plain paper sheets which is light-weight.

It is yet another object of the present invention to provide a facsimile transmission apparatus for plain paper sheets which has a reduced size.

It is a further object of the present invention to provide a facsimile transmission apparatus for plain paper sheets which is constructed in a simple step-wise manner.

It is still a further object of the present invention to provide a facsimile transmission apparatus for plain paper sheets which can be constructed with a reduced number of assembling processes.

To achieve these objects, there is provided a facsimile transmission apparatus for plain paper sheets using an electrophotographic developing system according to the present invention. Multi-functional, molded upper and lower frames are hinge-coupled with each other. The upper frame rotates at a constant angle relative to the lower frame. A photosensitive drum assembly, exposure device and fixing device are respectively installed within the upper frame which is specifically molded to accommodate their easy installation. A sheet cassette, pickup roller, conveyor roller, developing device and transfer device are respectively installed within the lower frame which is also specifically molded to accommodate easy installation of these components. The upper and lower frames have a base frame as their support, wherein a sheet reading device is installed at one side of the lower and base frames.

BRIEF DESCRIPTION OF DRAWINGS

A more complete appreciation of this invention, and many of the attendant advantages thereof, will be readily apparent as the same becomes better understood by reference to the following detailed description when considered in conjunction with the accompanying drawings in which like numbers indicate the same or similar numerals, and wherein:

FIG. 2 is a sectional view of a facsimile machine using plain paper sheets according to the present invention;

DETAILED DESCRIPTION OF THE PREFERRED EMBODIMENTS

In a facsimile transmission apparatus for plain paper sheets according to the present invention, as shown in FIGS.

Figure 4:
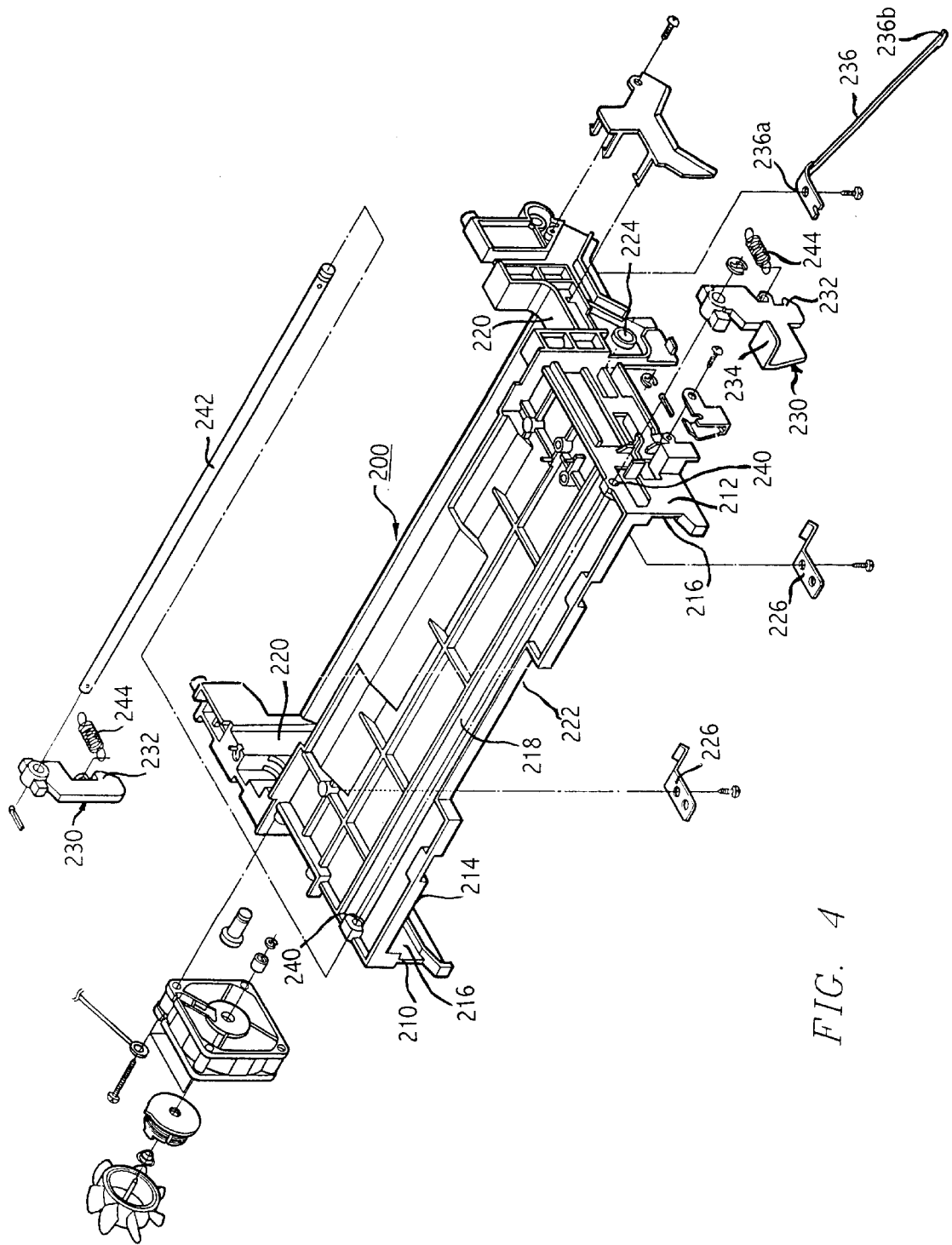
FIG. 4 is a perspective view showing the upper frame of FIG. 1A.

1A, 1B, 1C and 2, a lower frame 100 and an upper frame 200 are hinge-coupled with each other. Referring to FIG. 4, upper frame 200 has side walls extending downward 14 from a left-side end 210 and a right-side end 212 thereof. On an overhead portion of upper frame 200, a stopper 236 is fixably attached at one end by a screw for adjusting a rotating angle of upper frame 200 relative to lower frame 100. The other end of stopper 236 is inserted into a groove for insertion into lower frame 100. That is, one end of stopper 236 forms a groove 236a and the other end forms a locking projection 236b to enable locking of groove 236a.

FIG. 4 also shows a top portion 218 of upper frame 200 containing mounting groove 220 having a U-shaped opening for mounting a fixing device 950, which is shown in its mounted position in FIG. 2. Right and left ends of mounting groove 220 have a screw groove, while one of the ends has a guide bar for facilitating the mounting of fixing device 950.

Holes 240, which are provided for inserting a bracket supporting bar 242 for coupling upper frame 200 and lower frame 100, are positioned horizontally at both ends of top portion 218 of upper frame 200.

A locking bracket 230 for stably maintaining installation of upper frame 200 onto lower frame 100 is assembled at both ends of bracket supporting bar 242. Locking bracket 230 has a hook 232 for latching lower frame 100. Hook 232 latches onto an upper/lower frame locking shaft 148 (shown in FIG. 2) of lower frame 100. One end of locking bracket 230 is elastically supported by a tension coil spring 244 on upper frame 200, thereby enabling locking bracket 230 to resiliently attach to upper/lower frame locking shaft 148 shown in FIG. 2.

On left and right sides of an inner roof portion 222 of upper frame 200 are formed a pair of guide ribs and screw grooves in which position sensing springs 226 are inserted for maintaining a photosensitive drum assembly 900 at an optimal position. Position sensing springs 226 are each formed by a plate spring, the middle portion of which is bent in a downward direction to form an acute angle. Both sides of upper frame 200 have a hole 224 for assembling an exposure device supporting frame 250.

Figure 5:
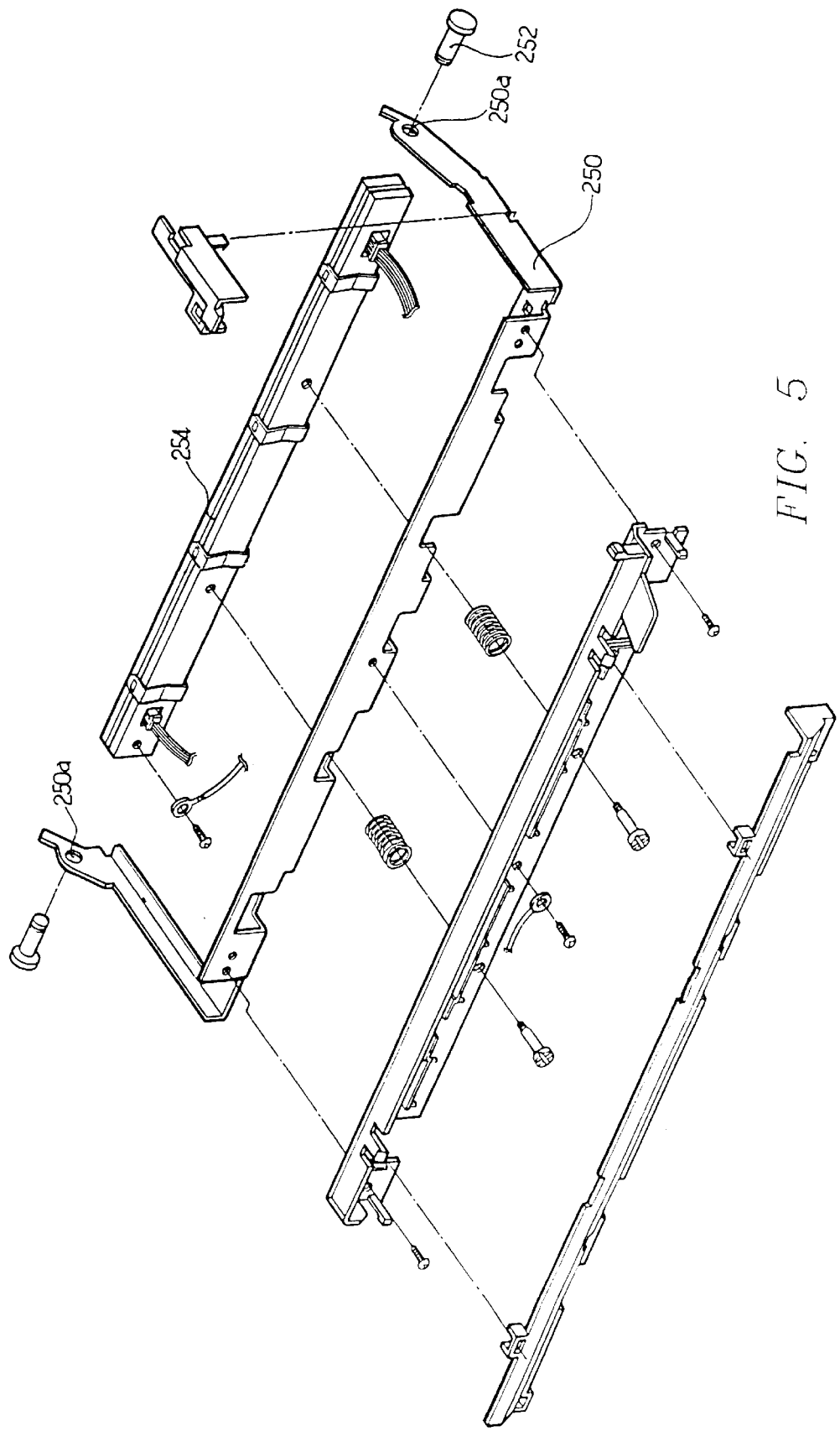
FIG. 5 is a perspective view showing the exposure device supporting frame of FIG. 1A.

Referring to FIG. 5, exposure device supporting frame 250 has a E-shape, and includes a light emitting diode ("LED") as an exposure device 254 which is assembled by a screw at a middle portion thereof. Exposure device supporting frame 250 has holes 250a on both sides which respectively align with holes 224 on both sides of upper frame 200 to facilitate their assembly. Alignment of the two sets of holes is secured by assembling pins 252.

Referring back to FIG. 4, guide members 216 having a funnel-shaped inlet are formed in a horizontal direction on inner sides 214 of upper frame 200 to accommodate assembly of photosensitive drum assembly 900.

Figure 8:
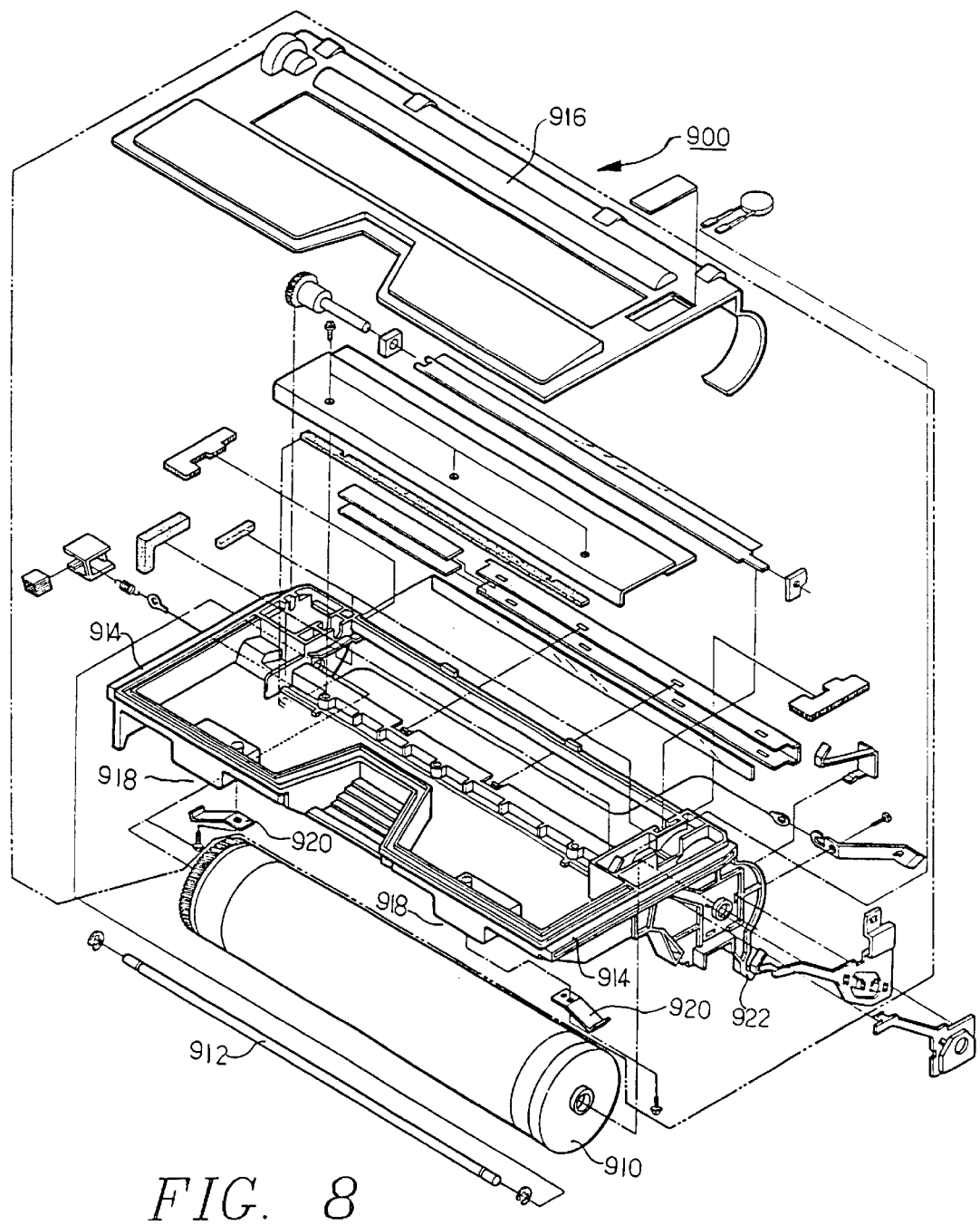
FIG. 8 is a perspective view showing the photosensitive drum assembly of FIG. 2.

Referring now to FIG. 8, outside ends of photosensitive drum assembly 900 include guide ribs 914 of a predetermined size which are disposed in a horizontal direction to facilitate easy insertion of photosensitive drum assembly 900 into guide members 216 shown in FIG. 4. That is, guide ribs 914 insert into guide members 216 on upper frame 200 to securely affix photosensitive drum assembly 900 within upper frame 200, as shown in FIG. 2.

A position sensing rib 916 protrudes from a top portion of photosensitive drum assembly 900 to ease assembly of photosensitive drum assembly 900 by assuring its optimal position along guide member 216 within upper frame 200, and further to prevent up-down movements of photosensitive drum assembly 900. Position sensing rib 916 is shaped in the form of a semicircular bar and extends along the top portion of photosensitive drum assembly 900. Position sensing rib 916 elastically contacts position sensing springs 226 (see FIG. 2) during insertion of photosensitive drum assembly 900 into upper frame 200 to prevent its further movement, thereby placing photosensitive drum assembly 900 in its optimal position (see FIG. 2).

On a bottom portion of photosensitive drum assembly 900 in FIG. 8, a pair of ribs and bosses 918 are formed to accommodate pressure springs 920. Pressure springs 920, which engage and assert pressure upon supporting ribs 712 of a developing device 700 (see FIG. 7), are fixedly attached to the bottom portion of photosensitive drum assembly 900 by screws. Pressure springs 920 are each formed by a plate spring, the middle portion of which is bent in a downward direction.

Figure 7:
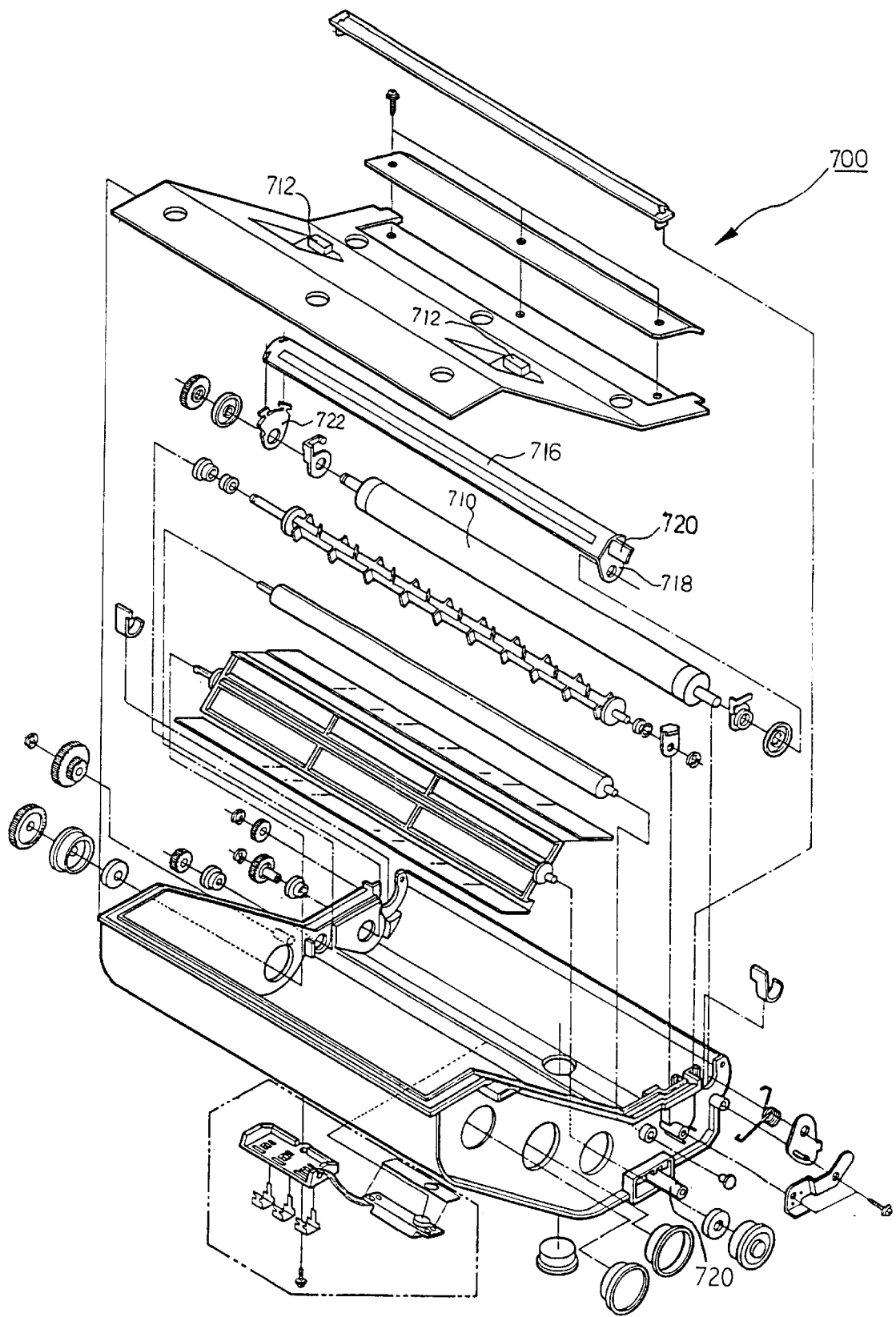
FIG. 7 is a perspective view showing the developing device of FIG. 2.

On a rear end of the bottom portion of photosensitive drum assembly 900 in FIG. 8, a rib 922 having a predetermined size is installed in a downward direction for opening and closing a magnetic roller cover 716 of developing device 700 (see FIG. 7). The rib 922 performs this by engaging a rotatable guide rib 720 on one side of developing device 700 shown in FIG. 7.

Figure 3:
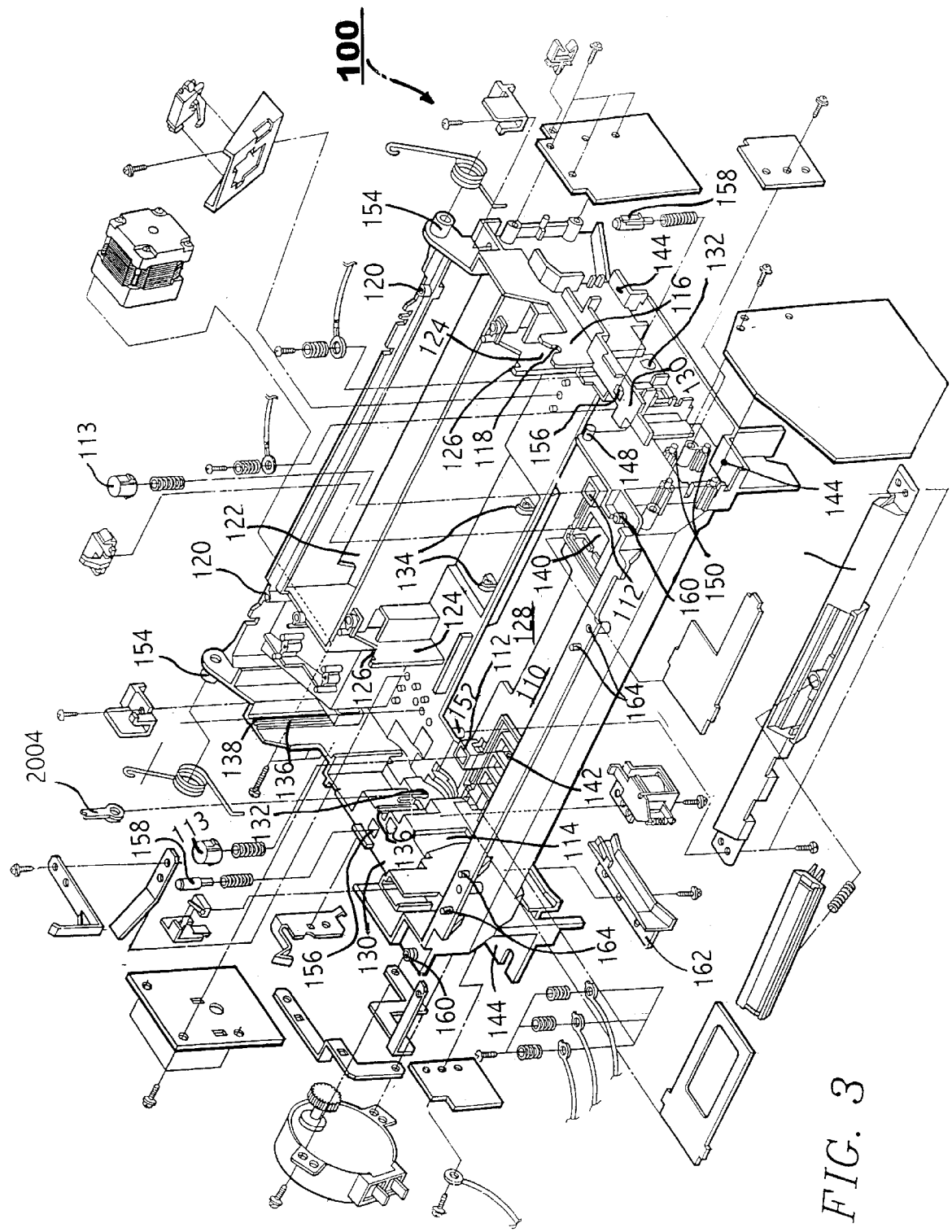
FIG. 3 is a perspective view showing the lower frame of FIG. 1B.

Referring to FIG. 3, a developing device guide opening 114 having a funnel-shaped inlet is disposed on an inner side of lower frame 100 to enable easy assembly of developing device 700 shown in FIG. 7.

Referring to FIGS. 2 and 3, a rib 116 having a predetermined size is positioned in an upward direction on one side of lower frame 100 for supporting a photosensitive drum shaft 912 of photosensitive drum assembly 900 of FIG. 8. Rib 116 has a V-shaped opening to enable easy installation of photosensitive drum shaft 912 at an optimum position. A mounting groove 118 having a semicircular shape is formed on a middle portion of rib 116 (see FIG. 3).

On an inner bottom portion 110 of lower frame 100 shown in FIG. 3, a guide groove 112 having an opened top portion is provided for enabling assembly of a developing device pressure supporting bar 113 at an optimal position.

Developing device pressure supporting bar 113, which is installed on an elastic material and inserted into guide groove 112, applies upward pressure on a lower portion of developing device 700 of FIG. 7, in order to maintain a constant distance between an outer circumference of photosensitive drum 910 (see FIGS. 2 and 8) and a center axis of a magnetic roller 710.

On a top portion of both sides 130 of lower frame 100 shown in FIG. 3, a guide groove 156 is formed at a preset depth to keep a constant optimal distance between exposure device 254 and photosensitive drum 910. This enables exposure device 254 to form an electrostatic latent image on photosensitive drum 910 by selectively exposing light onto photosensitive drum 910 to produce a uniform charging layer representative of the electrostatic latent image. The surface of photosensitive drum 910 is charged by a charger 902 (see FIG. 2) positioned a predetermined distance from photosensitive drum 910. Charger 902 is included in the photosensitive drum assembly 900. Guide groove 156 accommodates a pressure supporting bar 158 in order to control the position of exposure device supporting frame 250 shown in FIG. 5. Pressure supporting bar 158, which is installed on elastic material to control movement of exposure device supporting frame 250, serves to place exposure device 254 (i.e. LED) at a predetermined distance from the outer circumference of photosensitive drum 910.

On an inner portion of one side of lower frame 100 shown in FIG. 3, driving gear assembling members 136, which protrude like a rail, have holes 138 formed therein.

Figure 9:
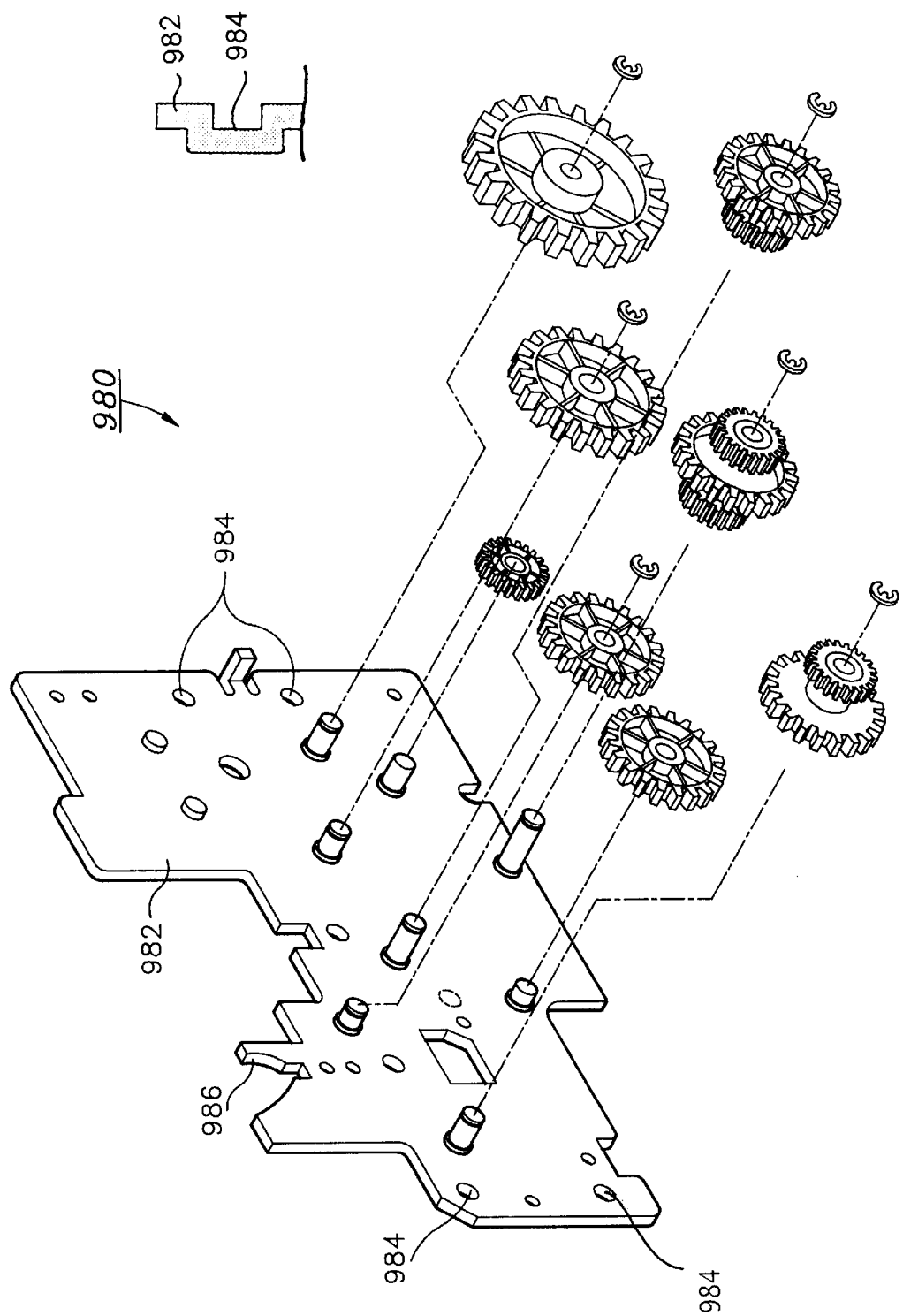
FIG. 9 is a perspective view showing the driving gear of FIG. 2.

Driving gear assembling members 136 shown in FIG. 3 aid in the construction of a driving gear assembly 980. Referring to FIG. 9, driving gear assembly 980 has an assembling plate 982 for accommodating various gears. Assembling plate 982 has an assembling guide recess 984 for insertion of driving gear assembling member 136 of lower frame 100, and assembling holes 985. Assembling guide recesses 984, which are half-blanked, are inserted into driving gear assembling member 136 on lower frame 100. The half-blanking method involves using a punch and dye to indent assembling plate 982, thereby forming assembling guide recesses 984. Additionally, assembling plate 982 contains a guide groove 986 for supporting one end of photosensitive drum shaft 912. Guide groove 986, which is formed on a top end of assembling plate 982, has an open top portion and a funnel-shaped inlet to enable easy installation of photosensitive drum shaft 912 at its optimal position.

Referring again to FIG. 3, a rear inner portion of lower frame 100 includes an assembling member 122 in the form of a hole for accommodating assembly of a power supply device 166 (shown in FIG. 1). A guide bar for facilitating assembly of power supply device 166 and an assembling boss having a screw groove are installed at right and left outer sides of lower frame 100. Assembling member 122, which also facilitates assembly of power supply device 166, is fixed to the assembling boss by a screw.

On a front portion of assembling member 122, guide ribs 124 having a predetermined size are formed on an inner bottom portion of lower frame 100 for assembling a transfer device 800 (shown in FIG. 2). Guide ribs 124 each have a V-shaped opening at a top portion and a reference member 126 at a front portion. Reference member 126 acts as a standard for assembly of transfer device 800. A guide bar and an assembling boss, which also act as a standard for assembly of transfer device 800, are positioned a specified distance from guide rib 124 on the front portion of assembling member 122.

On inner bottom portion 110 of lower frame 100, an assembling member 128 is installed in the form of a hole to enable assembly of a pickup guide plate 153. An assembling boss 152 for affixing pickup guide plate 153 is positioned at bottom outer side portions of assembling member 128. Assembling grooves 132 for inserting the shaft of a pickup roller 2000 are formed on both sides of assembling member 128 (i.e. both sides 130 of lower frame 100). A guide bar and screw groove 150 are positioned on an outside portion of lower frame 100 to accommodate assembly of a high pressure supplying print circuit substrate.

Referring to FIGS. 1A, 1B, 1C and 2, pickup roller 2000, which is inserted into assembling groove 132, has a supporting shaft 2002 to facilitate its rotation. When supporting shaft 2002 is inserted into assembling groove 132, a bearing 2004 (shown in FIG. 3) is inserted onto supporting shaft 2002 to affix pickup roller 2000.

As shown in FIG. 3, bearing 2004 includes a hole to accommodate insertion of supporting shaft 2002 and a position fixing bar to secure supporting shaft to lower frame 100. Bearing 2004 also includes a grip for ease of use.

A pair of supporting ribs 134 are positioned on a bottom rear portion of lower frame 100 (i.e. proximal to where assembling member 128 is positioned on inner bottom portion 110) to facilitate assembly of a conveyor roller pressure plate. Supporting ribs 134 are shaped such that they extend upwardly and then bend backward.

A mounting groove 140 for sensing the presence of a recording sheet is positioned on one end of the inner bottom portion of lower frame 100.

Another mounting groove 142, which has an open upper portion and controls the toner density of developing device 700 in dependence upon the presence of a recording sheet, is disposed on the other end of the inner bottom portion of lower frame 100.

A pair of assembling bosses 160 for affixing an intermediate cover are provided with screw grooves on front side portions of lower frame 100.

A pair of assembling bosses 120 for affixing rear cover are provided with a screw grooves on a horizontal portion of the rear of lower frame 100.

On a bottom outside portion of lower frame 100, there are a pair of assembling ribs and bosses having screw grooves for assembling a bracket 162 that supports a paper cassette. Bracket 162, which has a funnel-shaped opening and a guiding portion thereafter, is affixed to the assembling ribs and bosses by screws.

A guide bar and an assembling hole 164 for affixing a sheet reading device 400 (shown in FIG. 2) are provided on a top portion of one side of lower frame 100.

Assembling holes 144 for assembling a base frame 300 are provided on outer side portions of lower frame 100. On the bottom portion of lower frame 100, base frame 300 is connected onto lower frame 100 by screws that extend through assembling holes 144.

Referring to FIGS. 3 and 7, developing device 700, which is installed via guide opening 114 onto lower frame 100, has a guide pole 702 of a predetermined size that extends parallel to a bottom portion of both sides of developing device 700. Guide pole 702 is inserted into guide opening 114 onto lower frame 100. Supporting ribs 712, for enabling installation of developing device 700 at its optimal position, are positioned on a top portion of developing device 700 in an upward protruding manner. Supporting ribs 712 serve to maintain a constant uniform gap between photosensitive drum 910 and magnetic roller 710 of developing device 700.

Referring now to FIG. 7, a cover 716 is provided for protecting magnetic roller 710 of developing device 700. Cover 716 includes a supporting rib 718 formed on one end to enable movement of itself in a downward position and also includes a supporting plate 722 for magnetic roller 710 on the other end. Cover 716 protects magnetic roller 710 and also provides means for guiding paper sheets.

A rotatable guide rib 720, which has a predetermined size and extends parallel to an axis of magnetic roller 710, is provided for opening and closing magnetic roller cover 716 by contacting rib 922 of photosensitive drum assembly 900 (see FIG. 2).

Figure 1A:
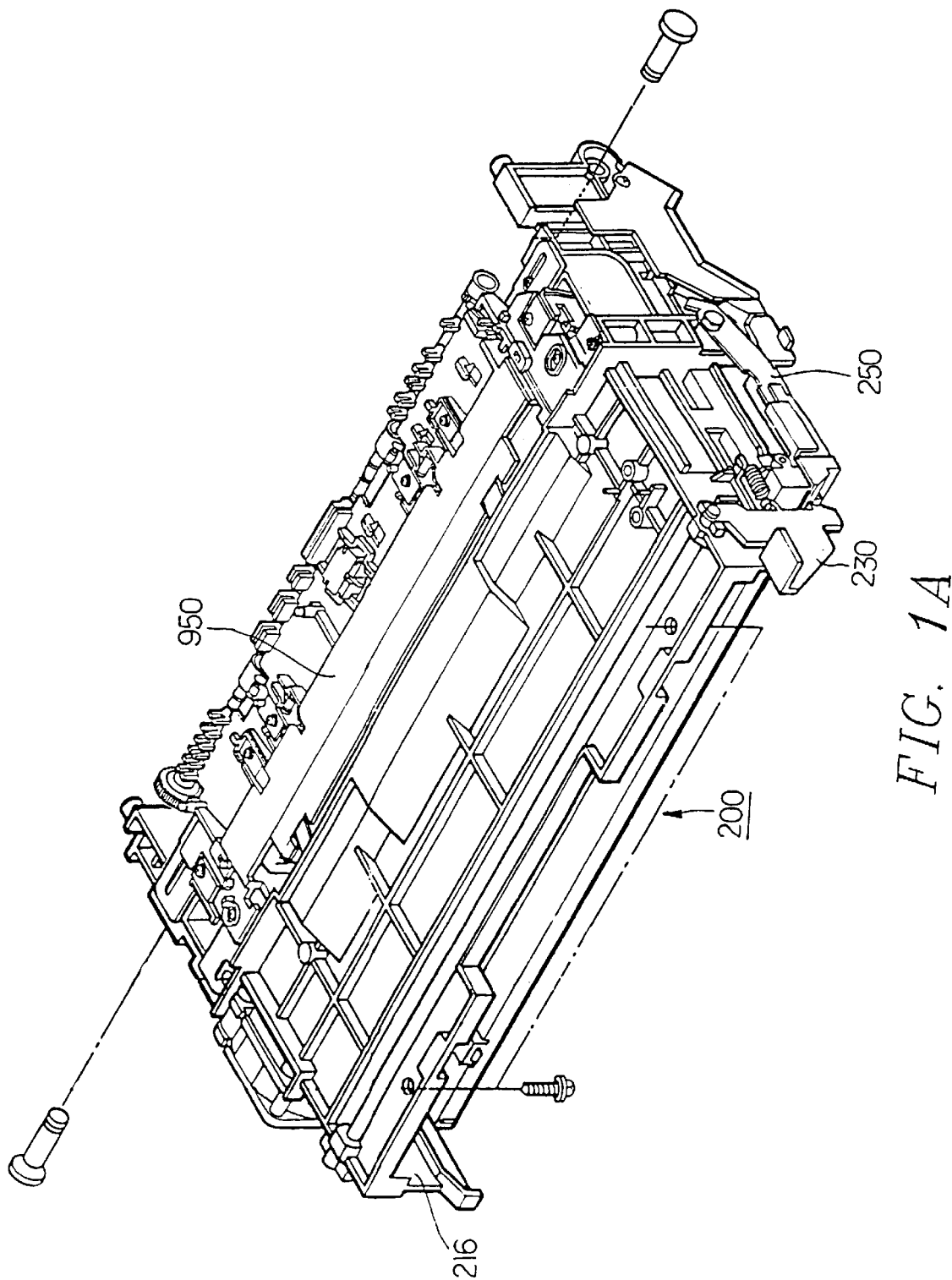
FIGS. 1A, 1B and 1C are exploded perspective views of a facsimile machine using plain paper sheets according to the present invention.
Figure 1B:
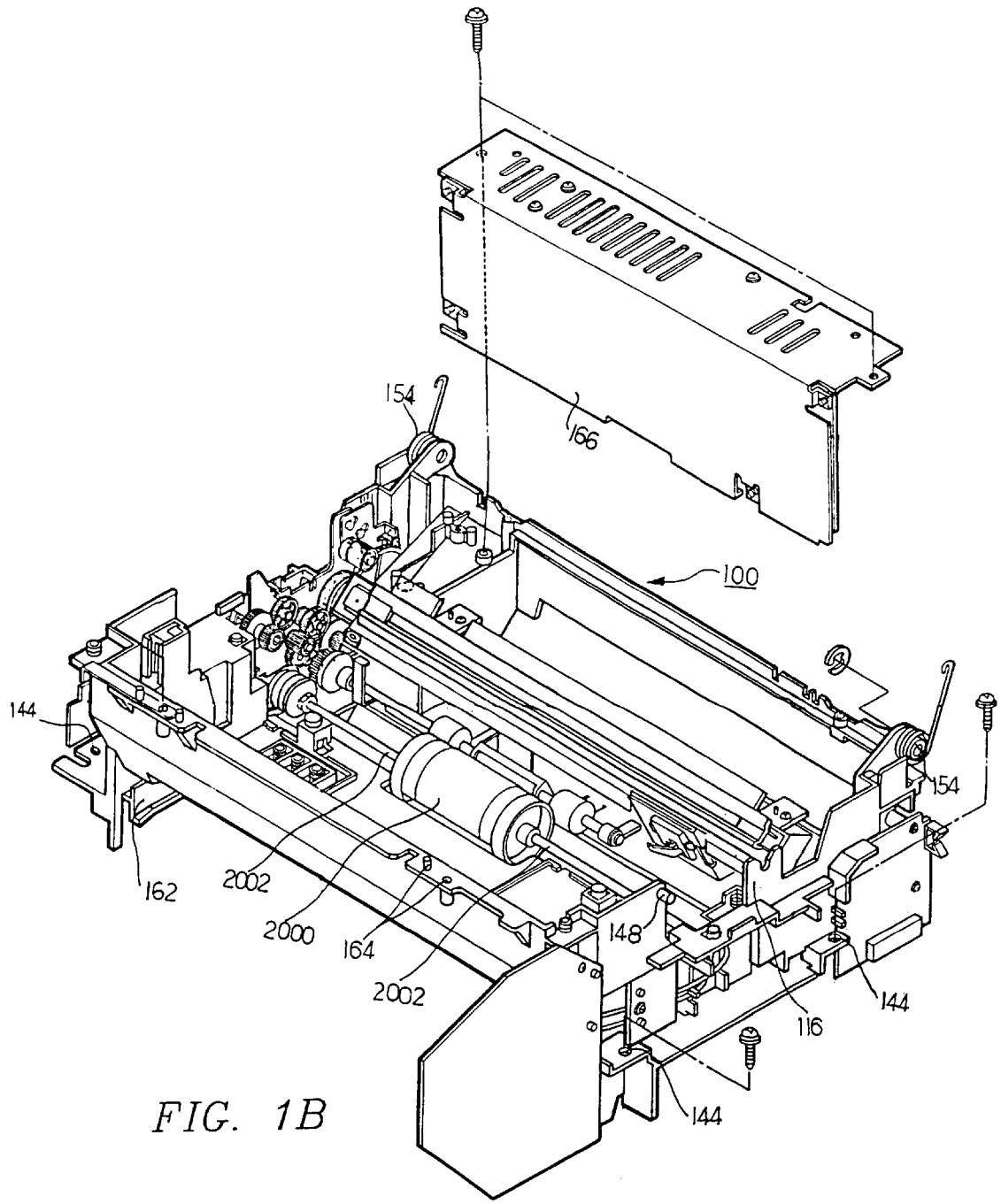
Figure 1C:
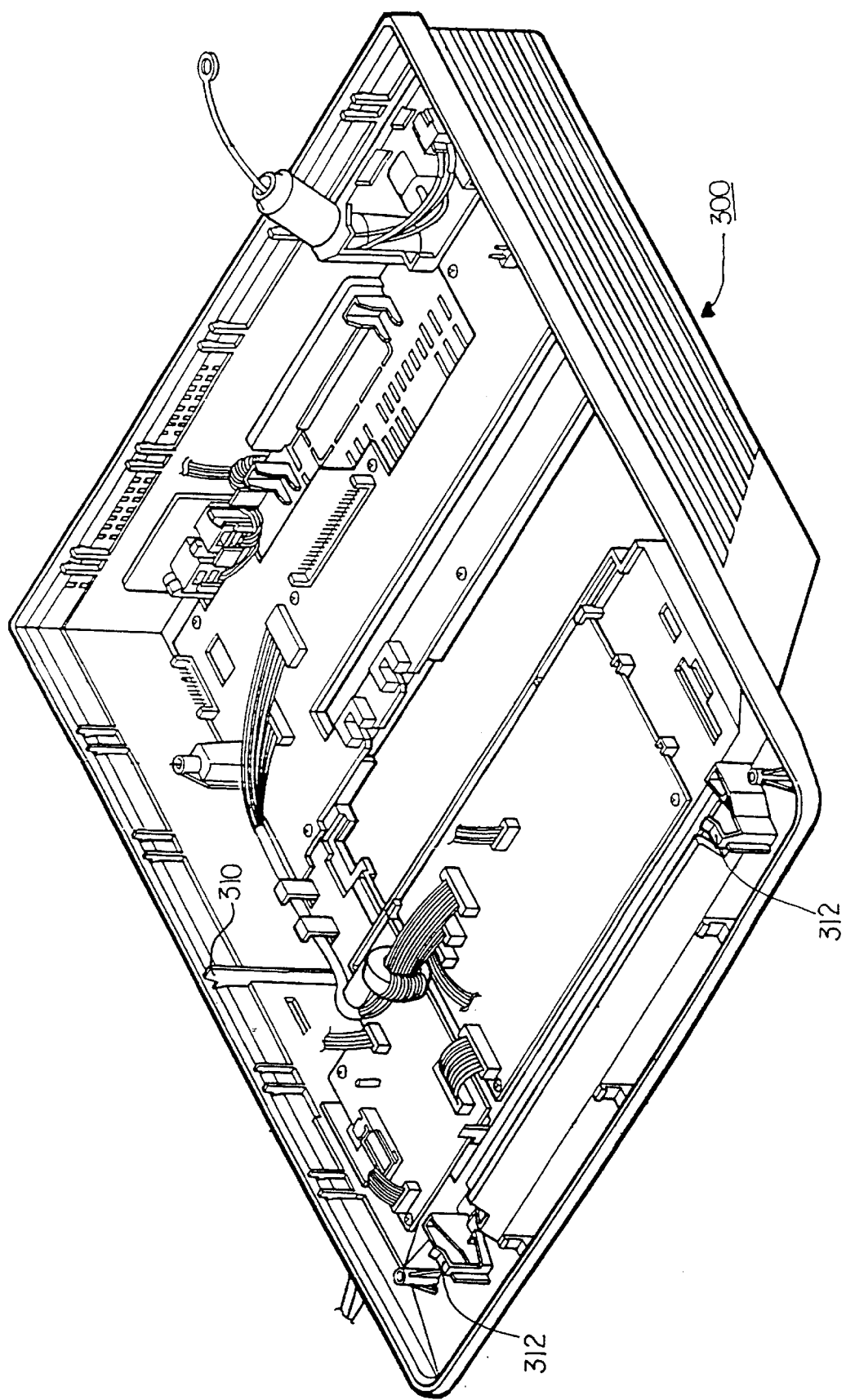

Referring to FIGS. 1A, 1B, 1C and 6, base frame 300 having a box-like shape and an open top portion is provided to connect with the bottom portion of lower frame 100. On left and right sides of base frame 300, a guide rib 310 which extends in a downward direction and has a predetermined size is provided for insertion of lower frame 100. Lower frame 100 inserts into guide rib 310 as shown in FIGS. 1A, B and C.

Base frame 300 also has guide ribs 312 which extend upwardly and then bend back for insertion of sheet reading device 400.

Figure 6:
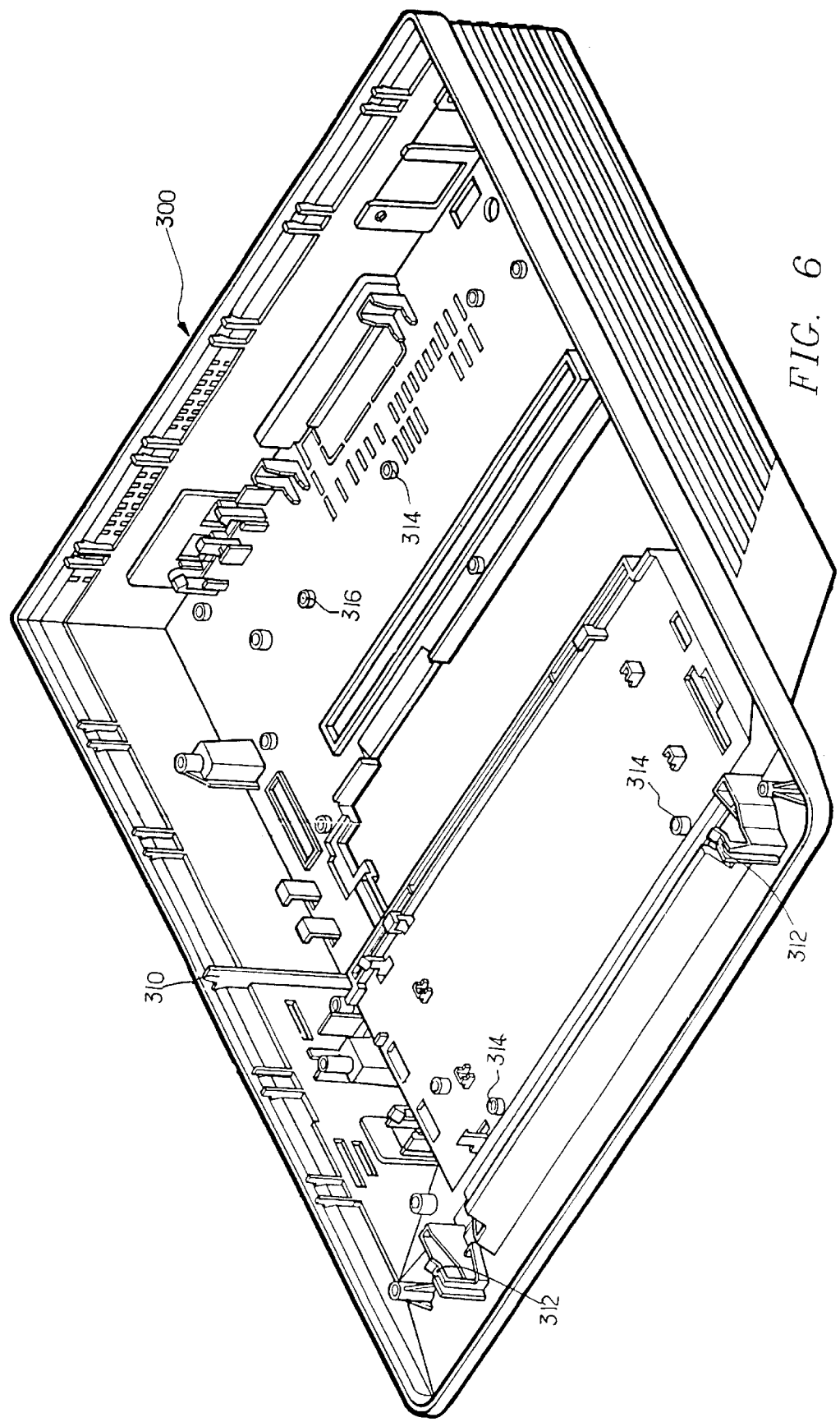
FIG. 6 is a perspective view showing the base frame of FIG. 1C.

Referring to FIG. 6, a boss and supporting rib 314 are provided on a front end of an inner bottom portion of base frame 300 to accommodate assembly of a main print circuit substrate. At a rear end of the inner bottom portion of base frame 300, another boss 316 is provided for assembly of an auxiliary print circuit substrate.

Figure 10:
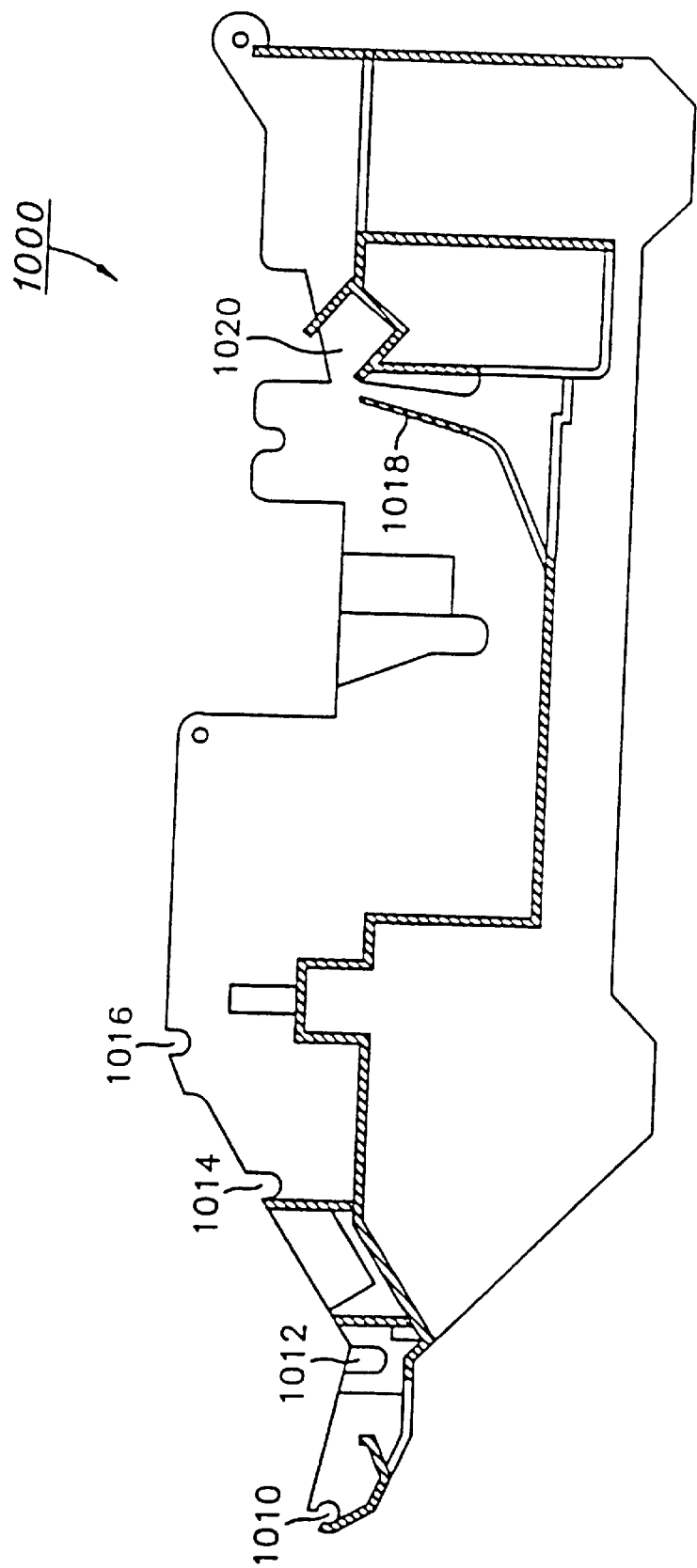
FIG. 10 is a sectional view showing the lower frame according to an another embodiment of the present invention.

Referring to FIG. 10, a sectional view of a transformed lower frame 1000 according to another embodiment of the present invention is shown. Transformed lower frame 1000 is molded into a unitary frame capable of accommodating a pickup roller, conveyor roller, developing device, transfer device, and sheet reading device. Transformed lower frame 1000 includes a sheet guide 1018 that extends in a downward direction and guides sheets of paper conveyed from the conveyor roller between the photosensitive drum assembly and transfer device. Transformed lower frame 1000 further includes a mounting groove 1020 which is inclined and has an open portion for accommodating installation of the transfer device. Transformed lower frame 1000 also includes several grooves to facilitate assembly of the sheet reading device. These grooves include a hinge mounting groove 1010 to enable rotation about the upper frame at a constant angle, an ejection roller mounting groove 1012 for accommodating an ejection roller of the sheet reading device, a conveyor roller mounting groove 1014 for accommodating a conveyor roller of the sheet reading device and a sheet division roller mounting groove 1016.

A process for assembling the components described above according to the principles of the present invention will hereinafter be presented.

First, the main and auxiliary print circuit substrates are assembled into the base frame 300 which serves as a support.

Before lower frame 100 is assembled into base frame 300, bracket 162 for supporting the paper cassette is affixed by a screw to the assembling rib and boss formed in the bottom portion of lower frame 100.

As shown in FIGS. 1A, B and C, lower frame 100 is then inserted onto guide rib 310, thereby installing lower frame 100 into base frame 300. Lower frame 100 is then fixed to base frame 300 by a screw inserted through assembling hole 144 on lower frame 100.

A hinge shaft 154 of lower frame 100 is then fixed by a hinge pin to enable rotation of upper frame 200 at a constant angle.

The paper cassette is mounted in bracket 162 which provides support for the paper cassette, and pickup guide plate 153 and friction plate for delivering paper sheets loaded in the paper cassette to developing device 700 are assembled using the assembling boss formed in the bottom portion of lower frame 100.

Shaft 2002 for supporting pickup roller 2000 is then inserted into pickup roller assembling groove 132 on lower frame 100 and bearing 2004 is inserted into shaft 2002. Sequentially, the grip of bearing 2004 is bent forward and the position fixing bar on the grip is affixed to the rib formed on the top portion of assembling groove 132 by being pushed to the right side.

The conveyor roller which rotates in engagement with pickup roller 2000 is assembled in the guide hole and assembling boss of inner bottom portion 110 of lower frame 100 by a screw.

Developing device 700 is installed in inner bottom portion 110 of lower frame 100 and is positioned on the top portion of pickup roller 2000 (see FIGS. 2 and 3). Developing device 700 is inserted by guide pole 702 onto lower frame 100, following the guide of developing device guide opening 114.

Shaft 912 of photosensitive drum 910 is then inserted into upper frame 200 while being guided by assembling guide member 216 of photosensitive drum assembly 900.

Exposure device supporting frame 250 is assembled into assembling hole 224 of upper frame 200 and secured by assembling pins 252, thereby placing exposure supporting frame between photosensitive drum assembly 900 and developing device 700. Exposure device 254 is elastically fixed to exposure device supporting frame 250.

Bracket supporting bar 242 is inserted into groove 240 on upper frame 200, as shown in FIG. 4, and locking bracket 230 is assembled at both ends thereof. Upper frame 200 is rotatable about hinge shaft 154, as discussed earlier. When upper frame 200 is rotated and placed upon lower frame 100, hook 232 on locking bracket 230 can attach to upper/lower frame locking shaft 148 on lower frame 100 to thereby secure union of the two frames. During this time, rib 922 for opening/closing magnetic roller cover 716 contacts rotatable guide rib 720 on the side of developing device 700. This causes rotable guide rib 720 to be displaced in a manner such that magnetic roller cover 716 rotates about the magnetic roller shaft and achieves an open position.

At this time, position sensing spring 226 for photosensitive drum assembly 900 on upper frame 200 engages position sensing rib 916 on photosensitive drum assembly 900. Spring 920 on the bottom portion of photosensitive drum assembly 900 engages and applies a downward pressure upon supporting ribs 712 on developing device 700. Developing device pressure supporting bar 113 mounted on lower frame 100 applies upward pressure on the bottom portion of developing device 700. As a result, photosensitive drum 910 and magnetic roller 710 can maintain a constant gap between each other.

Pressure supporting bar 158 applies upward pressure upon exposure device supporting frame 250 to maintain a constant gap between exposure device supporting frame 250 and photosensitive drum 910.

Photosensitive drum assembly shaft 912 is firmly installed in photosensitive drum shaft mounting groove 118 of lower frame 100 and guide groove 986 thereby supporting photosensitive drum shaft 912 on driving gear assembly 980.

Transfer device 800 located on the bottom right side of photosensitive drum 910 is then installed in guide rib 310 in accordance with the reference of transfer device assembling reference member 126 of lower frame 100 and is secured in the assembling boss by a screw.

Fixing device 950 located on a top right portion of transfer device 800 and photosensitive drum 910, is installed within mounting groove 220 and is secured to the assembling boss by a screw.

An ejection tray is installed in top portion 218 of upper frame 200 and is secured on upper frame 200 by a screw.

Sheet reading device 400 is installed via the assembling guide bar, assembling hole, and assembling guide rib for sheet reading device 400 formed on one end of lower frame 100.

During operation of the facsimile transmission apparatus of the present invention, the sheets of paper containing the information to be transmitted are first placed in a paper feeding device through use of a paper guide. A user then dials another party and once the user hears a transmitting sound, he presses a start button on an operating panel. Then, sheets of paper are automatically fed to a main driver roller and a pressure pinch roller. A reference level of data is adjusted by a sheet reading element comprised of a contact image sensor (CIS) and a white roller operating as a white level detecting device. The paper sheet is then ejected by an ejection roller and pressure pinch roller.

The data read from the paper is then passed through a transmission line via operation of a main control board.

In accordance with a series of programs that require transmitted data to be printed on a plain paper sheet under the control of the main control board, molecules in the air are ionized by a corona discharge unit of a charging device and the photosensitive drum is thereby uniformly covered with an electric charge layer.

The exposure device forms an electrostatic latent image on the photosensitive drum by selectively reflecting light in a uniform electric charge layer in accordance with the data received.

For visibility of the electrostatic latent image on the photosensitive drum, toner is selectively affixed to the developing unit.

At this time, a plain paper sheet in the paper cassette is picked up by the pickup roller and is supplied by the conveyor roller to transfer the visible image from the photosensitive drum onto the paper.

The residual toner and electric charge on the photosensitive drum are removed by the cleaner.

The toner transferred onto the sheet of paper is affixed by the temperature and pressure of the fixing device, and then the sheet of paper is transferred to the ejection tray.

As previously discussed, the facsimile transmission apparatus using a plain sheet of paper is comprised of a unitary molded frame. Accordingly, the apparatus has the advantages of being light and small. Furthermore, it has a simplistic design and can therefore be assembled with fewer steps than conventional devices.

What is claimed is:

1. A facsimile transmission apparatus for plain paper sheets using an electrophotographic developing system, said apparatus comprising:

a lower frame;

an upper frame rotatably-coupled to said lower frame, said upper frame being molded to accommodate assembly of an exposure unit, a fixing unit and a photosensitive drum configuration comprising a photosensitive drum and a charging device;

a supporting device coupled to said upper frame for supporting said exposure unit;

pressure supporting bars elastically installed on said lower frame to position said exposure unit a predetermined distance from an outer circumference of said photosensitive drum when said upper frame is rotated to engage said lower frame; and position sensing springs connected to said upper frame for maintaining said photosensitive drum assembly at a predetermined position relative to said upper frame.

2. The apparatus as claimed in claim 1, wherein said upper frame has first and second side walls extending downwardly on first and second ends of said upper frame, respectively, said first and second sidewalls each having a funnel-shaped guide member formed on an inner portion to accommodate insertion of said photosensitive drum configuration.

3. The apparatus as claimed in claim 1, further comprising a stopper having a first end attached to said upper frame for adjusting an angular position of said upper frame relative to said lower frame, said stopper having a locking projection on a second end opposite said first end, said second end being inserted into a groove on said lower frame.

4. The apparatus as claimed in claim 1, wherein first and second mutually opposing sides of said upper frame each provide a hole to enable assembly of said supporting device.

5. The apparatus as claimed in claim 4, wherein said upper frame provides guide members to accommodate assembly of said photosensitive drum configuration, said guide members defining a funnel-shaped inlet conformed to receive said photosensitive drum configuration.

6. The apparatus as claimed in claim 1, wherein a top portion of said upper frame contains mounting grooves defining an inlet conformed to receive said fixing unit.

7. The apparatus as claimed in claim 1, wherein said upper frame accommodates installation of a bracket supporting bar for supporting hook-shaped locking brackets that latch said upper frame to said lower frame.

8. The apparatus as claimed in claim 1, wherein said position sensing springs comprise plate springs.

9. The apparatus as claimed in claim 8, further comprised of said plate springs each being bent to form an acute angle.

10. A facsimile transmission apparatus for plain paper sheets using an electrophotographic developing system, said apparatus comprising:

a lower frame having an open top portion, said lower frame being molded to accommodate assembly within said lower frame of a developing device for selectively attaching toner to indicate a visible charging image on a photosensitive drum, a transfer device for transferring the visible charging image from said photosensitive drum to one of the paper sheets, a pickup roller for picking up the paper sheets, and a conveyor roller for conveying the paper sheets to said developing device;

an upper frame rotatably coupled to said lower frame, said upper frame being molded to accommodate assembly within said upper frame of an exposure unit, a fixing unit and a photosensitive drum configuration comprising said photosensitive drum and a charging device;

a supporting device coupled to said upper frame for supporting said exposure unit;

first bars elastically installed on said lower frame to position said exposure unit a predetermined distance from an outer circumference of said photosensitive drum when said upper frame is rotated to engage said lower frame; and second bars elastically installed on said lower frame to maintain a constant distance between the outer circumference of said photosensitive drum and a center axis of a magnetic roller of said developing device when said upper frame is rotated to engage said lower frame.

11. The apparatus as claimed in claim 10, wherein said upper frame provides guide members to accommodate assembly of said photosensitive drum configuration, said guide members defining a first inlet conformed to receive said photosensitive drum configuration.

12. The apparatus as claimed in claim 11, wherein a top portion of said upper frame contains mounting grooves defining a second inlet conformed to receive said fixing unit.

13. The apparatus as claimed in claim 10, wherein said first bars are respectively inserted into first guide grooves formed in said lower frame.

14. The apparatus as claimed in claim 10, wherein said developing device is inserted into a funnel-shaped inlet formed in said lower frame.

15. The apparatus as claimed in claim 10, further comprised of:

said photosensitive drum having a centrally positioned shaft; and a rib having a V-shaped opening positioned on one side of said lower frame for supporting said shaft, said rib having a semicircular mounting groove formed on a middle portion of said rib.

16. The apparatus as claimed in claim 10, further comprising assembling bosses positioned on a rear portion of said lower frame for affixing a rear cover.

17. The apparatus as claimed in claim 10, further comprising an assembling member positioned on a rear portion of said lower frame for facilitating assembly of a power supply device.

18. The apparatus as claimed in claim 10, further comprising guide ribs formed on said lower frame for enabling assembly of said transfer device, each said guide rib having a V-shaped opening at a top portion and a reference member at a front portion.

19. The apparatus as claimed in claim 10, wherein said lower frame provides a screw groove to accommodate assembly of a print circuit substrate.

20. The apparatus as claimed in claim 10, further comprising a pickup guide plate connected to a bottom portion of said lower frame.

21. The apparatus as claimed in claim 10, wherein said lower frame provides assembling grooves for insertion of a shaft of said pickup roller.

22. The apparatus as claimed in claim 10, further comprising a pair of supporting ribs positioned on a bottom portion of said lower frame to facilitate assembly of a conveyor roller pressure plate.

23. The apparatus as claimed in claim 10, further comprising a pair of driving gear assembly members positioned on an inner portion of one side of said lower frame, each of said driving gear assembling members having a hole formed therein.

24. The apparatus as claimed in claim 10, further comprised of a pair of assembling bosses positioned on front side portions of said lower frame for affixing an intermediate cover.

25. The apparatus as claimed in claim 10, wherein a bottom portion of said lower frame provides a groove for sensing the presence of one of the paper sheets.

26. The apparatus as claimed in claim 10, wherein a bottom portion of said lower frame provides a groove used for controlling toner density of said developing device.

27. The apparatus as claimed in claim 10, further comprised of a plurality of grooves positioned on an end portion of said lower frame to facilitate assembly of a sheet reading device.

28. The apparatus as claimed in claim 10, further comprised of a bracket having a funnel-shaped opening and a guiding portion for supporting a paper cassette.

29. The apparatus as claimed in claim 10, wherein said lower frame provides assembling holes to enable attachment of said lower frame to a base frame that supports said lower frame.

30. A facsimile transmission apparatus, comprising:

a lower frame;

an upper frame rotatably-coupled to said lower frame;

a photosensitive drum configuration having a photosensitive drum connected to said upper frame;

an exposure device for enabling formation of an electrostatic latent image on said photosensitive drum by selectively exposing light onto said photosensitive drum;

a support frame connected to said upper frame for supporting said exposure device;

pressure supporting bars elastically installed on said lower frame for engaging said support frame to maintain a constant optimal distance between said exposure device and said photosensitive drum when said upper frame is rotated to engage said lower frame; and position sensing springs connected to said upper frame for maintaining said photosensitive drum assembly at a predetermined position relative to said upper frame.

31. A facsimile transmission apparatus, comprising:

an upper frame having first and second guide members;

a photosensitive drum assembly having a photosensitive drum for receiving toner to form a toner image, said photosensitive drum assembly being inserted into said first and second guide members of said upper frame;

a developing device for providing the toner to said photosensitive drum; and pressure springs connected to said photosensitive drum assembly for respectively engaging and applying pressure upon supporting ribs of said developing device.

32. The apparatus as claimed in claim 31, further comprised of a position sensing rib that protrudes and extends along a top portion of said photosensitive drum assembly, said position sensing rib contacting position sensing springs extending from said upper frame during insertion of said photosensitive drum assembly into said first and second guide members of said upper frame to prevent further movement of said photosensitive drum assembly and place said photosensitive drum in an optimal position.

33. The apparatus as claimed in claim 31, further comprising a projection extending from said photosensitive drum assembly for opening and closing a magnetic roller cover of said developing device.

34. The apparatus as claimed in claim 32, further comprised of said position sensing rib exhibiting a semi-circular shape.

35. The apparatus as claimed in claim 34, wherein said pressure springs each comprise a plate spring.

36. A facsimile transmission apparatus using an electrophotographic developing system, said apparatus comprising:

an upper frame molded to accommodate installation of a photosensitive drum configuration comprising a photosensitive drum and a charging device;

a lower frame rotatably connected to said upper frame;

pressure sensing springs connected to said upper frame for maintaining said photosensitive drum assembly at a predetermined position relative to said upper frame; and a locking bracket connected to said upper frame, said locking bracket having a hook portion that latches to a shaft on said lower frame, said locking bracket being elastically supported on one end by a tension coil spring on said upper frame to enable said locking bracket to resiliently attach to said shaft.

37. A facsimile transmission apparatus using an electrophotographic developing system, said apparatus comprising:

an upper frame molded to accommodate installation of a photosensitive drum assembly having a photosensitive drum and a pair of position sensing springs;

a lower frame rotatably connected to said upper frame and having a funnel-shaped inlet; and a developing device having a magnetic roller for supplying toner to said photosensitive drum and a guide pole extending outwardly from first and second mutually opposing sides of said developing device, said guide pole being inserted into said funnel-shaped inlet of said lower frame to install said developing device within said apparatus.

38. The apparatus as claimed in claim 37, further comprised of a pair of ribs positioned on a top portion of said developing device, said pair of ribs protruding from said top portion of said developing device and respectively engaging said pair of position sensing springs extending from said photosensitive drum assembly to maintain a constant uniform gap between said photosensitive drum and said magnetic roller.

39. The apparatus as claimed in claim 37, further comprised of a cover for protecting said magnetic roller, said cover having a supporting rib formed on a first side to enable movement of said cover in a first direction and a supporting plate on a second side opposite to said first side for providing support to said magnetic roller.

40. The apparatus as claimed in claim 39, further comprised of a rotatable guide rib extending parallel to an axis of said magnetic roller for opening said cover in response to engaging a contacting rib extending from said photosensitive drum.

41. A facsimile transmission apparatus for a plain paper sheet using an electrophotographic developing system, said apparatus comprising a upper frame, a lower frame and a driving gear assembly connected to said lower frame, said driving gear assembly having an assembling plate for accommodating various gears of said driving gear assembly, said assembling plate forming an assembling guide protrusion and an assembling hole, wherein said assembling guide protrusion is half-blanked and inserts into an assembly member on said lower frame to connect said driving gear assembly to said lower frame.

42. The apparatus as claimed in claim 41, further comprising a guide groove having an open top portion and a funnel-shaped inlet formed on a top end of said assembling plate for accommodating a photosensitive drum shaft of said apparatus.

43. A facsimile transmission apparatus for using an electrophotographic developing system, said apparatus comprising an upper frame, a lower frame and a base frame having a box-like shape and an open top portion for insertion of said lower frame, said base frame having guide ribs that accommodate insertion of a sheet reading device.

44. A facsimile transmission apparatus for a plain paper sheet using an electrophotographic developing system, said apparatus comprising an upper frame, a lower frame and a paper cassette, said lower frame having a bracket for supporting said paper cassette, said bracket having a funnel-shaped opening followed by a guiding portion to enable insertion of said paper cassette into said lower frame.

45. A facsimile transmission apparatus using an electrophotographic developing system, said apparatus comprising a transformed lower frame molded into a unitary structure having an open top portion for accommodating a pickup roller, a first conveyor roller, a developing device, a transfer device, and a sheet reading device, said transformed lower frame having an inclined mounting groove with an open portion for insertion of said transfer device and a plurality of grooves on an end portion for insertion of said sheet reading device.

46. The apparatus as claimed in claim 45, further comprising a sheet guide extending in a first direction for guiding paper sheets conveyed from said first conveyor roller between a photosensitive drum assembly and said transfer device.

47. The apparatus as claimed in claim 45, further comprised of said plurality of grooves comprising a hinge mounting groove for enabling rotation of said sheet reading device about an upper frame at a constant angle, an ejection roller mounting groove for accommodating an ejection roller of said sheet reading device, a conveyor roller mounting groove for accommodating a second conveyor roller of said sheet reading device and a sheet division roller mounting groove.

48. A method for assembling components of a facsimile apparatus having a lower frame, an upper frame rotatably-coupled to said lower frame and a base frame, said method comprising the steps of:

attaching a bracket for supporting a paper cassette to a bottom portion of said lower frame;

inserting said lower frame into said base frame using a guide rib on said base frame as a reference;

assembling a hinge shaft onto said lower frame to enable rotation of said upper frame about said lower frame;

mounting said paper cassette in said bracket;

assembling a guide plate into said bottom portion of said lower frame, said guide plate for delivering paper sheets from said paper cassette to a developing device;

inserting a first shaft supporting a roller disposed to pickup the sheets of paper from said paper cassette into a groove formed in said lower frame;

securing said first shaft by inserting a bearing onto said first shaft on a top portion of said groove;

inserting said developing device into a guide opening conforming to receive said developing device on said lower frame to position said developing device on a top portion of said pickup roller;

inserting a photosensitive drum assembly into a guide member conforming to receive said photosensitive drum assembly on said upper frame;

positioning a frame for supporting an exposure device on said upper frame between said photosensitive drum assembly and said developing device by inserting assembling pins into an assembling hole on said upper frame; and rotating said upper frame about said lower frame to position said upper frame on top of said lower frame while a first rib extending from said photosensitive drum assembly engages a second rib positioned on said developing device causing a cover of said developing device to open.

* * * * *